United States Patent [19]
Valentino

[11] 3,893,829
[45] July 8, 1975

[54] GAS PURIFICATION APPARATUS

[76] Inventor: Joseph V. Valentino, 1120 Jensen Ave., Mamaroneck, N.Y. 10543

[22] Filed: July 13, 1972

[21] Appl. No.: 271,484

[52] U.S. Cl. ............... 55/225; 55/228; 55/259; 55/310; 261/35
[51] Int. Cl. ............................................ B01d 47/06
[58] Field of Search ............ 55/220, 225, 240–241, 55/267–269, 309–314, 404–405, 212–213, 259, 324, 228, DIG. 20, 235–239; 261/35, 79

[56] References Cited
UNITED STATES PATENTS

| | | | |
|---|---|---|---|
| 2,074,152 | 3/1937 | Mueller | 55/313 |
| 2,345,859 | 4/1944 | Randolph | 55/241 X |
| 2,681,799 | 6/1954 | Ackeren | 261/117 |
| 2,689,715 | 9/1954 | Ericson | 55/241 X |
| 3,192,689 | 7/1965 | Smith | 55/259 X |
| 3,336,733 | 8/1967 | Wisting | 261/35 X |
| 3,406,498 | 10/1968 | Wisting | 55/404 X |
| 3,432,153 | 3/1969 | Drum | 55/241 X |
| 3,442,232 | 5/1969 | White | 55/259 X |
| 3,487,607 | 1/1970 | Cox | 55/269 X |
| 3,608,278 | 9/1971 | Greenspan | 55/212 |
| 3,760,567 | 9/1973 | Stalker | 55/222 |

*Primary Examiner*—Bernard Nozick

[57] ABSTRACT

A self-contained apparatus for the purification of gases which comprises a gas column in communication with a scrubbing chamber to permit the passage of gas from the column to the chamber. Turbine means is mounted for rotation in the gas column and is also connected to liquid pumping means. The movement of the gases through the column drives the turbine means which, in turn, activates the liquid pumping means so as to pump liquid from a reservoir into the scrubbing chamber. The action of the liquid on the gases in the chamber serves to remove the foreign matter entrained therein. The scrubbed gases are then released to the atmosphere via a gas discharge outlet.

25 Claims, 2 Drawing Figures

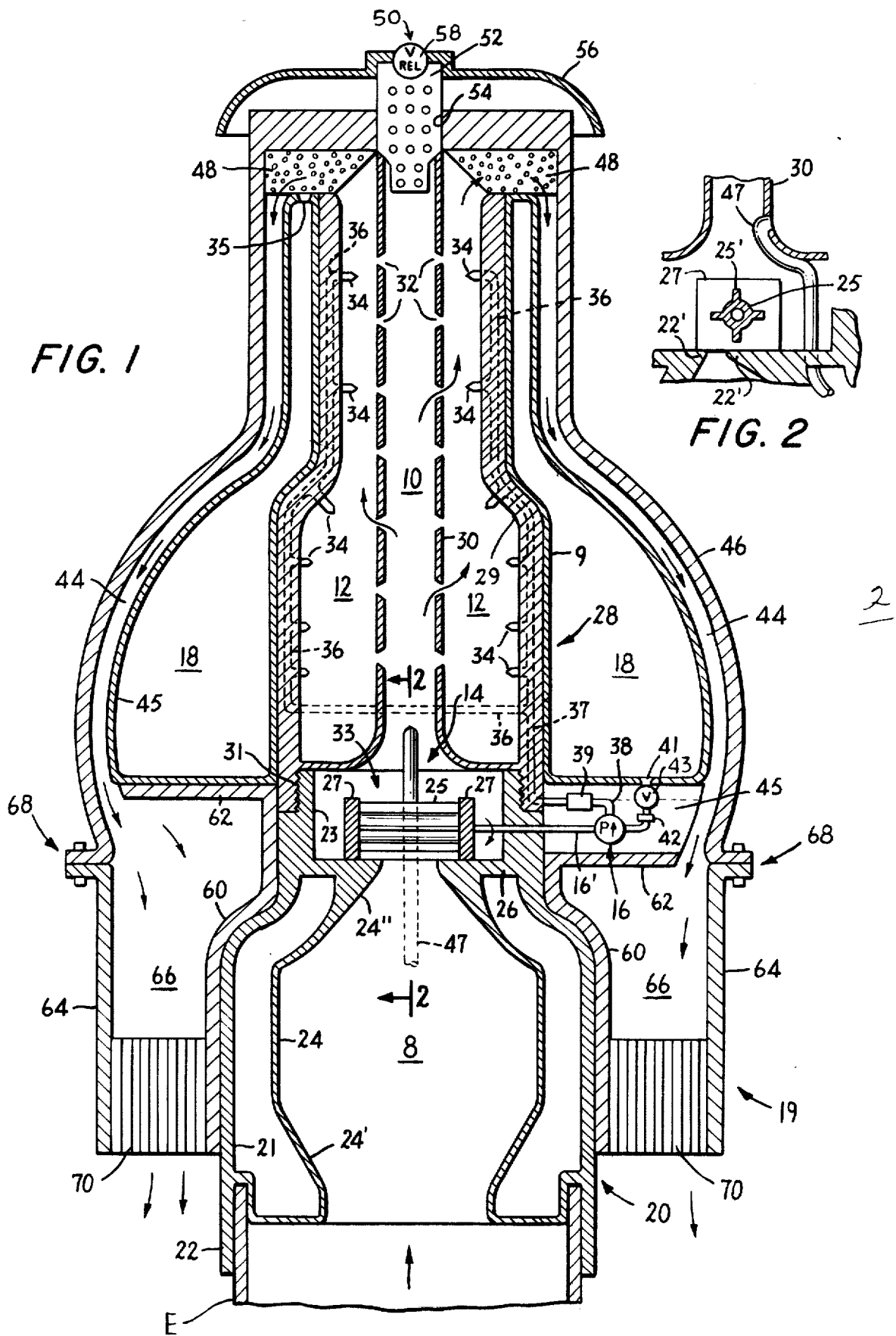

GAS PURIFICATION APPARATUS

This invention relates to a self-contained, self-powered apparatus for removing impurities from exhaust gases.

Air pollution is a problem which is of great concern to our modern day society. Since a large portion of this pollution is caused by particulate matter contained in smoke and gases discharged from boilers, incinerators, automobiles and the like, considerable research is being undertaken in order to devise new methods for solving the difficult problem of purifying the gases before they are released into the atmosphere. The difficulty involved in trying to remove these impurities is further aggravated by the high temperature of the gases and the minute size of some of the impurities entrained therein. To date, most of the gas purification systems being used are permanently installed fixtures which necessarily involve complex and sophisticated component parts and which depend on the availability of external sources of electricity and/or scrubbing liquid.

There are, however, numerous instances where permanent systems are not appropriate due to their overly large size and the unavailability of external electrical and liquid sources. Roofer's kettles, tar pots, lawn mowers, automobile exhausts and the like are typical instances where gas purification would best be effected by means of compact, self-contained portable systems.

It is the object of this invention to provide an apparatus which is capable of efficiently removing impurities from exhaust gases.

A further object is to compactly arrange and mount the component parts of the assembly so as to impart portability thereto.

A still further object is to provide a purification apparatus which is not dependent upon external sources of electricity and scrubbing liquid.

Another object is to provide an apparatus which is self-powered in that the movement of the gases through the system provides the motive force for introducing the scrubbing liquid into the appropriate chamber.

Various other objects and advantages of this invention will become apparent from a reading of the disclosure that follows hereinafter.

The gas purification apparatus of my invention is a self-powered, portable system which contains all of the essential parts thereof in compact arrangement. Thus, the apparatus employs turbine means mounted for rotation in a gas column which is in communication with a scrubbing chamber. As the gases move through the column into the scrubbing chamber, they activate the turbine means which in turn activate liquid pumping means. The pumping means draw liquid from a reservoir and introduce the liquid into the scrubbing chamber where it acts upon and purifies the incoming gases.

In contrast to the prior art systems, it is seen that the instant apparatus is totally self-contained and thus is not dependent on external sources of electric power and/or scrubbing liquid. Rather, the apparatus stores its own liquid requirement and utilizes the movement of gas through the system as the motive force to introduce the liquid into the scrubbing chamber. The apparatus eliminates the need for manual activation and supervision since liquid delivery will be automatically initiated with the entry of the gases and, correspondingly, will be automatically terminated with the cessation of the gas influx. Furthermore, the component parts of the apparatus are positioned and mounted so as to provide a compact, self-contained apparatus which can be readily moved and positioned in accordance with the particular needs of the practitioner.

To the accomplishment of the above, the present invention relates to a gas purification apparatus as defined in the appended claims and as described in the specification, together with the accompanying drawings in which:

FIG. 1 is a view partly in cross section and partly in elevation, depicting a gas purification apparatus constructed in accordance with the invention; and FIG. 2 is a cross-sectional view taken along the line 2—2 of FIG. 1.

The gas purification apparatus of the present invention is adapted for use with any exhaust system having a gas efflux of sufficient energy (kinetic and thermal) to drive a turbine. The apparatus comprises a self-contained unit adapted to be conveniently mounted on the outlet end of an exhaust conduit and when so mounted is ready for automatic operation without manual intervention without the need for any other external connections.

The basic component parts of the apparatus of this invention consist of an inlet chamber 8, a central gas column 10, an annular scrubbing chamber 12 communicating with the central gas column 10, turbine means 14 mounted between said inlet chamber and said central gas column, a liquid reservoir 18, liquid pumping means 16 adapted to pump scrubbing liquid from the reservoir 18 into the scrubbing chamber 12, and an annular outlet section 19.

When the device is properly mounted on an exhaust conduit the exhaust gases enter the inlet chamber 8 and are directed with increased velocity past turbine means 14 into the aligned central gas column 10. The turbine 14 is drivingly connected to the pump 16 which is effective in response to the flow of exhaust gases past the turbine to pump scrubbing liquid from the liquid reservoir 18 upwardly along the outer wall of the scrubbing chamber. Means are provided on the inner wall of the scrubbing chamber 12 for allowing exhaust gases from the gas column 10 to enter the chamber 12 at evenly spaced locations therealong and the outer wall of the chamber is provided with evenly spaced spray means for spraying scrubbing liquid under pressure into the scrubbing chamber. The mixture of the exhaust gases with a fine spray of scrubbing liquid under high pressure and high velocity conditions is effective to remove a substantial portion of the impurities entrained in the gases. The operation of the turbine means 14 and pump 16 and the scrubbing of the gases in chamber 12 continues until such time as no additional gases are introduced into gas column 10. The scrubbed gases are discharged through outlet section 19 into the atmosphere without also spewing undesirable particulate matter into the atmosphere. Effective gas purification is thus achieved as a result of the integrated performance of the self-contained, self-powered apparatus of this invention.

Referring now to the specific and preferred embodiment of the gas purification apparatus of this invention illustrated in FIG. 1, it will be seen that inlet chamber 8 is defined by a cylindrical inlet section 20 which comprises an outer wall 21 defining a lip 22 at its lower end adapted to be inserted over an exhaust conduit such as the exhaust stack of a boiler, incinerator, tar pot or the like and here designated E and a reduced neck portion 23 at its upper end. Formed integral an inlet section 20 and spaced internally of outer wall 21 is a baffle wall 24 having a constricted inlet portion 24' and an outlet nozzle 24". The lower end of inlet portion 24' is spaced from lip 22 to define an annular slot within which the exhaust conduit E may be firmly seated, thereby to insure that all exhaust gases are directed into chamber 8. It will be appreciated that the specific construction here shown is merely exemplary and that many alternate structures may be designed for fitting the inlet section 22 of the device onto the exhaust conduit involved. Indeed, since the device is designed for use with a variety of exhaust conduits having varying dimensions, it may be desirable to provide for detachable and/or adjustable fittings and such structure while not specifically described herein is contemplated.

Baffle wall 24 is designed to constrict the flow of the incoming gases, increase their kinetic energy and direct them through nozzle 24" against the blades of turbine means 14, thereby to impart rotation thereto in conventional turbine fashion. Turbine means 14 comprises a conventional turbine or equivalent structure 25 having blades 25' here illustrated schematically mounted on the upper annular wall 26 of inlet section 20 by suitable mounting blocks 27. Reference may be made to FIG. 2 for a schematic illustration of the manner in which nozzle opening 24" is positioned off-center so as to direct the incoming gases against turbine blades 25' for driving turbine means 14. In addition, baffle wall 24 together with outer wall 21 define an annular chamber which serves to insulate the heat and noise associated with the incoming exhaust gases from the surrounding structure and environment.

Mounted above turbine means 14 is a cylindrical housing 28 in the form of an annular trough defining scrubbing chamber 12 and comprises an outer wall 29 and an inner wall 30. The bottom end of inner wall 30 is flared radially outwardly toward outer wall 29 and is integrally attached thereto thereby to close off the bottom end of scrubbing chamber 12 and to provide a flared inlet to gas column 10 defined within inner wall 30.

Housing 28 may be secured to inlet section 20 by any suitable means and is here shown threadedly engaged at 31 with neck portion 23. It will be noted that these members when secured together as shown form an enclosed chamber 33 between nozzle 24" and gas column 10, within which turbine means 14 is mounted.

The inner wall 30 of housing 28 is provided with a plurality of openings 32 spaced circumferentially and along its entire length to allow the exhaust gases to pass from the central gas column 10 into scrubbing chamber 12 as indicated by the arrows in the drawing. Those openings 32 are preferably relatively small in size and may be tapered inwardly to provide for uniform high pressure, high velocity discharge of the gases radially outwardly into the annular scrubbing chamber 12, thereby to provide uniform and thorough mixing with the scrubbing liquid while insuring against flow of the scrubbing liquid into gas column 10. The scrubbing liquid is introduced into the chamber 12 in a fine uniform spray by means of a plurality of spray nozzles 34 mounted by any suitable means circumferentially on the interior of housing wall 29 along substantially its entire length. Those nozzles are fed by liquid flow lines 36 preferably mounted within the housing wall 29.

Those liquid flow lines 36 communicate with a header 37 which extends outwardly from wall 29 at its lower end and is secured to an outlet pipe 38 from pump means 16 by a suitable pipe fitting 39. The inlet pipe 40 of pump means 16 is operatively connected to the outlet 41 of reservoir 18 by another standard pipe fitting 42, suitable valve means 43 being provided at the reservoir outlet 41. Pump means 16 comprises a conventional variable delivery pump and is driven by turbine 25 through a drive shaft 16' journalled within the neck portion 23 of wall 21.

Reservoir 18 is defined by a fluid supply tank 45, preferably of annular configuration and adapted to fit concentrically outwardly of housing 28.

Scrubbing chamber 12 may be drained of used scrubbing liquid by any suitable conduit means such as drain pipe 47 (see FIG. 2), having its outlet end extending through outlet section 19 in any suitable manner (not shown). The liquid content in reservoir 18 may consist solely of water although chemical solutions and other liquids appropriately selected for any particular cleaning properties may also be used. Reservoir 18 may be filled through liquid fill plug 35 although other reservoir configurations may dictate other filling approaches.

Subsequent to the scrubbing operation in scrubbing chamber 12, the scrubbed gases are forced into the discharge passage 44 which, in turn, feeds into outlet section 19. The discharge passage 44 is defined between the exterior wall of liquid supply tank 45 and a housing 46 which encompasses the entire apparatus. Due to the turbulence of the upwardly rising gases within scrubbing chamber 12 there may be some liquid and/or additional foreign particles still entrained in the gases. It is desirable that these particles be removed from the gases prior to being discharged into the atmosphere. In order to remove these particles, an annular filter means 48 is provided between the top wall of housing 46 and the liquid supply tank 45 in the area of communication between scrubbing chamber 12 and discharge passage 44. Filter 48 preferably comprises a suitable foraminous material and serves both to absorb the liquid particles and to catch any particulate matter which may still be entrained in the exiting gases.

It will be appreciated that substantial gas pressure may be built up within gas column 10 depending upon the velocity and pressure of the gases exiting from the exhaust conduit E. While a certain amount of pressure is desirable as previously noted in order to provide uniform dispersement of gases into the scrubbing chamber 12 and good mixing action therein, an excessive pressure buildup in column 10 will impede the satisfactory operation of the device. Accordingly, in order to provide relief from excessive pressure buildups, a pressure relief means generally designated 50 is provided at the top of central gas column 10. That means comprises a filter 52 having a porous central portion extending therethrough, the filter 52 is adapted to seat within a central aperture 54 in the upper wall of housing 46 and extend into gas column 10. A cover member or cap 56 is seated on the upper end of plug filter 52 and may be secured to housing 46 by any suitable means (not shown). Cap 56 is provided with a central pressure relief valve 58 of conventional construction in registration with plug filter 52. Relief valve 58 is preferably designed to be activated in response to a pressure buildup within column 10 of a magnitude which would reduce the pressure differential across turbine means 14 sufficiently to impair satisfactory pumping of scrubbing fluid. Plug filter 52 is designed to entrap a substantial portion of the solid particles which may be entrained in the thus released unscrubbed exhaust gases. Accordingly, such released gases will be substantially devoid of any solid particles and thus will not negate the fundamental purification objectives of the apparatus of this invention.

Outlet section 19 comprises an annular housing having a curved inner wall 60 adapted to snugly fit concentrically on the outer wall 21 of inlet section 20, an overhanging top wall 62 upon which liquid supply tank 45 is adapted to be seated and a cylindrical outer wall 64 spaced from inner wall 60 by suitable radially extending brackets (not shown) and defining a wide annular discharge passage 66. Housing 46 is preferably bolted to the outer wall 64 of outlet section 19 by suitable bolt means 68, thereby to define a continuous outer wall for the discharge of the scrubbed gases to the atmosphere. As illustrated in FIG. 1, when the device is fully assembled the overhanging wall 62 extends radially outwardly below supply tank 45 to the outer edge of that tank, spaced from housing 46 to allow for the passage of discharge gases. The area directly below wall 62 serves as an expansion chamber to cool the exhaust gases prior to discharge. As shown at the righthand side of FIG. 1, the wall 62 is recessed at 62' at a particular location along its peripheral length to provide for the mounting of pump means 16 below liquid supply tank 45.

The outlet passage 66 is provided with an annular discharge filter 70 preferably having a honey comb or grid structure designed primarily for the condensation of vapor from the exhaust gases thereby to further scrub the gases of any remaining impurities.

While the specific arrangement and design of the component parts of the apparatus as herein illustrated may be varied, the arrangement described herein and depicted in the drawing illustrates the compactness and portability of the apparatus.

As previously indicated, the apparatus of this invention can be utilized in conjunction with virtually any exhaust gas stack. Such stacks may be of substantial size such as those utilized with boilers, incinerators, and the like or they may be of smaller size such as those associated with tar kettles, automobile exhausts, lawn mower exhausts and the like. The advantages of the apparatus of this invention, e.g., portability, compactness, and self-power, will, however, be available regardless of the size of the stack or the volume of exiting gases.

In the operation of the apparatus as depicted in FIG. 1, the upwardly rising gases from the exhaust stack E, which include a variety of solids and particulate material, enter the inlet chamber 8 and are directed by baffle wall 24 under high pressure through nozzle 24'' thereby to drive turbine 25 in the manner illustrated in FIG. 2. The rotation of turbine 25 activates the liquid pumping means 16 which is effective to pump liquid via header 37, pipes 36 and spray nozzles 34 into scrubbing chamber 12. The rising gases flow into the gas column 10 and through openings 32 into the scrubbing chamber 12 and are there thoroughly mixed with and scrubbed by the sprayed scrubbing liquid. The scrubbing operation is accomplished by the liquid which captures and entrains the particles in the gases, the particles with used liquid settling in the bottom of the scrubbing chamber 12 and being drained therefrom. The cleaned gases are then forced upwardly through filter 48 into discharge passage 44 and thence through outlet filter 70 in discharge passage 66 for non-polluting release into the atmosphere.

The device as herein described may be regularly cleaned to prevent clogging of openings 32 by removing cap 56 and plug filter 52, an air jet or the like being directed into gas column 10. For more thorough cleaning and/or maintenance, repair or replacement of parts, the main housing 46 is removed by releasing bolt means 68, thereby to expose the interior of the device. Thereafter, the valve 43 is closed and reservoir outlet 41 is detached from the pump inlet 40 by manipulation of pipe fitting 42, whereby the supply tank 45 may be lifted off of ledge 62 thereby to fully expose pump means 16. Pipe fitting 39 may then be manipulated to detach the pump outlet 38 from the header 37 and housing 28 may thereafter be detached from inlet section 20 thereby to expose the turbine means 14.

Summarizing, it is thus seen that this invention provides a gas purification apparatus which features a self-powered liquid scrubbing technique wherein such liquid scrubbing is directly responsive to the introduction of gases into the system; and a compact self-contained unit wherein all the essential component parts are compactly housed within the apparatus; each of these features contributing to the portability and ease of use of the instant apparatus.

While the invention has been described in terms of the specific embodiments herein, it should be apparent that variations thereof may be developed without departing from the spirit or scope of the invention.

I claim:

1. An apparatus for the purification of gases comprising a gas column having a gas receiving inlet and a normally closed substantially cylindrical portion of substantially uniform diameter in fluid communication therewith, said portion having a plurality of openings therein, a closed scrubbing chamber annularly disposed around said portion and in fluid communication therewith through said openings to permit the passage of gas from said to said chamber, turbine means mounted for rotation in said column and adapted to be rotated by gas moving through said column, liquid pumping means operatively connected to said turbine means to be driven thereby, a liquid reservoir, said liquid reservoir being annularly disposed about said chamber, means for introducing liquid into said chamber in a direction substantially opposite to the direction of the flow of gas as the gas enters said chamber, said liquid pumping means being operatively connected between said reservoir and said liquid introducing means and effective when driven to pump liquid from said reservoir through said introducing means into said scrubbing chamber and a gas discharge outlet in communication with said chamber.

2. The apparatus of claim 1, wherein said turbine means comprises a rotatable shaft with vanes mounted thereon.

3. The apparatus of claim 1, wherein said liquid introducing means is mounted on the exterior wall of said scrubbing chamber and is in communication with said chamber by means of a plurality of spray nozzles mounted on said liquid introducing means and extending into said chamber.

4. The apparatus of claim 1, wherein a check valve is attached to the end of said liquid introducing means positioned in said liquid reservoir to provide single direction liquid flow into said liquid introducing means.

5. The apparatus of claim 1, wherein filtering means are positioned in the area of communication between said scrubbing chamber and said gas discharge outlet.

6. The apparatus of claim 1, wherein said gas discharge outlet is fitted with dispersing means to dissipate liquid particles exiting with said scrubbed gases.

7. The apparatus of claim 1, further comprising pressure sensitive means comprising a porous plug inserted in the top of said portion and a relief valve in fluid communication with said plug.

8. The apparatus of claim 1, wherein said gas discharge outlet is fitted with dispersing means to dissipate liquid particles exiting with said scrubbed gases.

9. The apparatus of claim 1, wherein said gas column contains a porous plug inserted in the top thereof.

10. The apparatus of claim 1, wherein said liquid introducing means in mounted on the exterior wall of said scrubbing chamber and is in communication with said chamber by means of a plurality of spray nozzles mounted on said liquid introducing means and extending into said chamber.

11. The apparatus of claim 10, wherein said scrubbing chamber is annularly disposed around said column above said turbine means.

12. The apparatus of claim 10, wherein said gas discharge outlet is fitted with dispersing means to dissipate liquid particles exiting with said scrubbed gases.

13. The apparatus of claim 11, wherein said gas column contains a perforated plug inserted in the top thereof.

14. The apparatus of claim 11, wherein said pressure sensitive means comprises a porous plug inserted in the top of said portion.

15. The apparatus of claim 1, which is completely disposed within a housing therefor.

16. The apparatus of claim 15 which contains covering means to close the top of said housing.

17. The apparatus of claim 16, wherein said gas column contains a porous plug inserted in the top thereof, said porous plug extending beyond said column to engage a reciprocal slot in said covering means and direct the seating thereof on said housing.

18. The apparatus of claim 17, wherein said covering means contains an aperture leading into said slot and valve means in said aperture for release of excess gas pressure.

19. The apparatus of claim 1, wherein said gas receiving inlet has a baffle mounted therein.

20. The apparatus of claim 19, wherein said baffle is shaped in the area preceding said turbine means to direct the flow of said incoming gases against said turbine means.

21. The apparatus according to claim 1 further comprising pressure sensitive means for normally closing said portion and adapted, in the event of a pressure build up in said portion beyond a given line, to open said portion to permit escape of gas from said column.

22. The apparatus of claim 21 which is completely disposed within a housing and which contains covering means to close the top of said housing.

23. The apparatus of claim 22 wherein said pressure sensitive means extends through said covering means.

24. The apparatus of claim 23, wherein said pressure sensitive means comprises a porous plug inserted in the top of said portion, said plug extending beyond said portion to engage a reciprocal slot in said covering means and direct the seating thereof on said housing.

25. The apparatus of claim 24, wherein said covering means contains an aperture leading into said slot and wherein said pressure sensitive means further comprises a relief valve situated in said aperture.

* * * * *